United States Patent Office 3,234,247
Patented Feb. 8, 1966

3,234,247
PREPARATION OF N-ACYL TAURATES
Phillip G. Abend, Chicago, Ill., and Andrew T. Guttman, Lakewood, Ohio, assignors to Armour and Company, Chicago, Ill., a corporation of Delaware
No Drawing. Filed May 17, 1962, Ser. No. 195,390
3 Claims. (Cl. 260—401)

This invention relates to the preparation of surfactants, and more particularly to Igepon T-type detergents.

We have discovered that by employing an inert solvent in a process in which a fatty amide is reacted with sodium isethionate in the presence of a basic catalyst, the yield can be increased manyfold.

A primary object of the invention, therefore, is to provide a process for the preparation of a surfactant compound in which a fatty amide in an inert solvent is heated to reaction temperature in the presence of a basic catalyst for the recovery of the desired surfactant compound. A further object is to provide a new method for the preparation of an Igepon T-type surfactant or synthetic detergent by employing a novel combination of steps. Other specific objects and advantages will appear as the specification proceeds.

In one embodiment of our invention, we prepare a surfactant compound by heating a fatty amide in an inert solvent with an excess of sodium isethionate and in the presence of a basic catalyst to reaction temperatures and thereafter separate the resulting solid reaction product. By way of example, one mole of a fatty amide is condensed in an inert solvent with an excess (10–100% molar excess) of sodium isethionate in the presence of a basic compound as a catalyst and at a temperature of about 160° to 210° C.

The reaction may be described as follows:

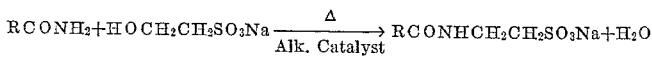

$$RCONH_2 + HOCH_2CH_2SO_3Na \xrightarrow[\text{Alk. Catalyst}]{\Delta} RCONHCH_2CH_2SO_3Na + H_2O$$

Any basic catalyst may be employed, as, for example, an alkali metal, alkaline earth metal, hydroxide, alcoholate, hydride, amide, acetylide, etc.

The inert solvent may be any non-reactive solvent, and examples may be cited as polyethylene glycol ethers, N-methyl pyrrolidone, dimethyl sulfoxide, etc., and mixtures of the solvents.

The temperatures are those at which reaction occurs, and we prefer to employ a temperature range of from 160° to 210° C., the preferable range being between 180° and 190° C.

Specific illustrative examples of the process may be set out as follows:

*Example I*

To a solution at 165° C. of 341 g. of hydrogenated tallow amide in a mixture consisting of 1200 ml. of triethylene glycol dimethyl ether, 800 ml. of diethylene glycol dimethyl ether and 100 ml. of xylene were added 18.5 g. of sodium methylate and 276 g. of sodium isethionate. The temperature was gradually raised to 188° C., by which time 350 ml. of solvent had distilled over. The reaction mixture was allowed to cool to room temperature, an equal volume of methanol added, and the resulting mixture filtered. The filter cake was washed with methanol, then with ether and dried by exposure to air. The product weighed 495 g., and contained 90% active material as determined by titration with a standard cationic solution.

*Example II*

To a solution at 165° C. of 18.4 g. of hydrogenated tallow amide in a mixture consisting of 200 ml. of N-methyl-2-pyrrolidone and 20 ml. of xylene were added 1 g. of sodium methylate and 9.9 g. of sodium isethionate. The temperature was raised to 185° C. and held between 185° and 193° C. for two hours. The reaction mixture was allowed to cool to room temperature and was then filtered. The filter cake was washed with methanol, then with ethyl ether and dried by exposure to air. The product, a white powder, weighed 19.5 g. and contained 84% active material as determined by titration with a standard cationic solution.

*Example III*

To a solution at 155° C. of 14.3 g. of coco amide in a mixture consisting of 200 ml. of triethylene glycol dimethyl ether and 20 ml. of xylene was added 1 g. of sodium methylate. The temperature was raised to 160° C. and 14.8 g. of sodium isethionate was added. The temperature was then raised to 190° C. and maintained between 190° and 198° C. for two hours. The reaction mixture was allowed to cool to room temperature. 150 ml. of ethyl ether was added and the mixture filtered. The filter cake was slurried with a mixture consisting of ethyl ether and acetone, then filtered and dried by heating on a steam bath. The product weighed 27 g. and contained 74% active material as determined by titration with a standard cationic solution.

While, in the foregoing specification, we have set forth specific procedural steps in considerable detail for the purpose of illustrating embodiments of the invention, it will be understood that such detail or details may be varied widely by those skilled in the art without departing from the spirit of our invention.

We claim:

1. In a process for the preparation of a detergent compound having the structure $RCONHCH_2CH_2SO_3Na$, wherein R is an alkyl chain having from 10 to 20 carbon atoms, the step of condensing a fatty amide in an inert solvent selected from the group consisting of polyethylene glycol ethers, N-methyl pyrrolidone and dimethyl sulfoxide with an excess of sodium isethionate in the presence of xylene and a basic compound as a catalyst, said basic compound being selected from the group consisting of alkali metals, alkaline earth metals, hydroxides, alcoholates, hydrides, amides, and acetylides at a temperature of from about 160° to 210° C.

2. The process of claim 1 in which the temperature of heating is within the range of about 180–190° C.

3. The process of claim 1 wherein said sodium isethionate has a molar excess of 10 to 100 percent.

References Cited by the Examiner
UNITED STATES PATENTS 2,366,452   1/1945   Mack _____ 260—401
2,432,850  12/1947   Albrecht _____ 260—401

OTHER REFERENCES

Cited in Chemical Abstracts 51, 4357a (1957).

McArdle, Use of Solvents in Synthetic Organic Chemistry, page 3, (1925), D. Van Nostrand Co., New York, N.Y.

Urushibara et al., Bull. Inst. Chem. Res., Kyoto University 32, 159–167 (1954).

CHARLES B. PARKER, *Primary Examiner.*

DANIEL D. HORWITZ, *Examiner.*